July 18, 1950 W. J. MILLER 2,516,067
CLAMP-ON TRUCK HITCH
Filed Feb. 5, 1948
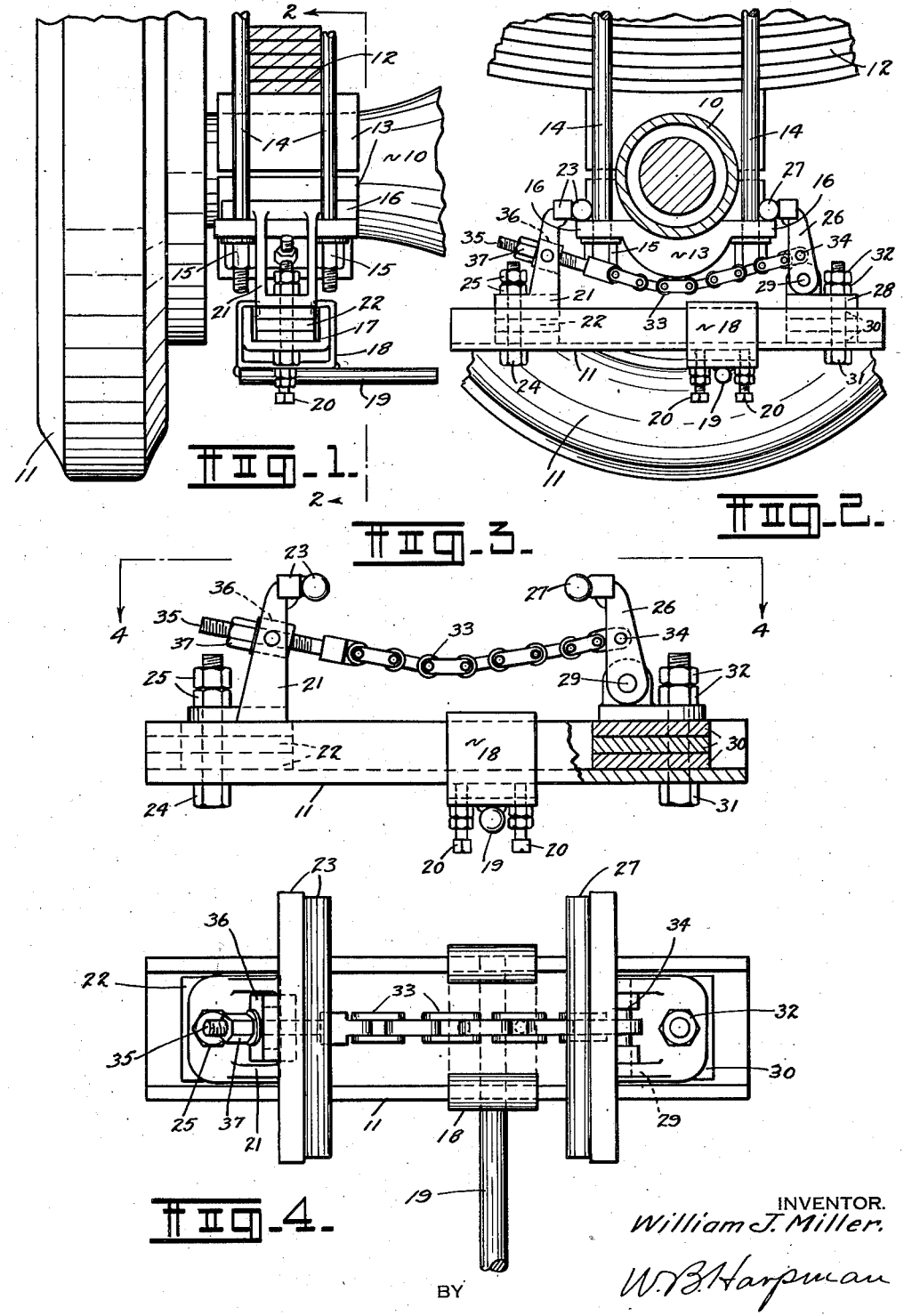
INVENTOR.
William J. Miller.
BY W. B. Harpman
ATTORNEY.

Patented July 18, 1950

2,516,067

UNITED STATES PATENT OFFICE 2,516,067

CLAMP-ON TRUCK HITCH

William J. Miller, Youngstown, Ohio, assignor to Hy-Way Machinery, Incorporated, Youngstown, Ohio, a corporation of Ohio Application February 5, 1948, Serial No. 6,462

3 Claims. (Cl. 280—33.44)

This invention relates to hitches and more particularly to a clamp-on hitch for attachment to a truck rear axle construction.

The principal object of the invention is the provision of a clamp-on type truck hitch.

A further object of the invention is the provision of a clamp-on type truck hitch universally applicable to truck rear axle constructions.

A still further object of the invention is the provision of a clamp-on type hitch of simple economic formation.

A still further object of the invention is the provision of a clamp-on type truck hitch which may be adjusted vertically and longitudinally to position a hitching member at a predetermined location.

A still further object of the invention is the provision of a clamp-on type truck hitch easily applied to a conventional truck rear axle construction.

The clamp-on type truck hitch shown and described herein has been devised to form a more satisfactory hitch for application to truck rear axle constructions to provide an attachment member to which devices such as material spreader boxes may be affixed. It is well known in the art of paving and road laying that various forms of spreader boxes are commonly employed for laying the rough courses of paving material as well as the finishing courses of paving material, and that among these spreader boxes, certain types are known and used which require attachment to a truck rear axle for propelling the spreader box with respect to the roadway. One such spreader box is illustrated in Patent No. 2,403,820, issued July 9, 1946.

The present invention relates to a truck hitch suitable for use in connection with such spreader boxes. The clamp-on type truck hitch disclosed herein is particularly useful in temporary application to truck rear axle constructions, for instance, where a fleet of trucks is rented for a given operation and truck hitches applied to the said trucks for use during the operation.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a rear view of a portion of a truck rear axle and wheel and showing the clamp-on type hitch in position thereon.

Figure 2 is a side elevation taken on line 2—2 of Figure 1.

Figure 3 is an enlarged side elevation of the hitch illustrated in Figures 1 and 2.

Figure 4 is a top view of the hitch illustrated in Figure 3 and taken on line 4—4 of Figure 3.

By referring to the drawings and Figures 1 and 2 in particular it will be seen that a truck rear axle 10 is partially illustrated in connection with a portion of a rear wheel 11 and a portion of a spring 12 positioned on a pair of oppositely disposed saddle caps 13 on the axle 10. The truck frame (not shown) is supported, as known in the art, by the spring 12. Vertically positioned U bolts 14 are shown positioned about the spring 12 and passing downwardly at either side of the axle 10 and engaging the saddle caps 13. Nuts 15, threadably engaging the lower threaded ends of the inverted U bolts 14 hold the saddle caps 13 and the spring 12 in assembled position on the truck axle 10. This structure is common in truck constructions and it will be observed that the lowermost one of the saddle caps 13 is relatively longer than the uppermost saddle cap and is provided with the openings through which the inverted U bolts 14 pass. This construction necessitates the formation of oppositely disposed shoulders 16 on the front and back edges of the saddle cap 13 adjacent the openings through which the inverted U bolts 14 are positioned.

The clamp-on type hitch disclosed herein is adapted to be positioned on the saddle cap 13 by clamping engagement on the shoulders 16 and against the U bolts 14 passing therethrough. This is best illustrated in Figure 2 of the drawings and also shown in Figures 1, 3 and 4.

The clamp-on type hitch comprises a longitudinal body member 17 positioned beneath the saddle cap 13 and providing means for adjustably mounting a slidable bracket 18 which in turn has a hitch member 19 integrally formed therewith. As shown in Figures 1 and 2 of the drawings the slidable bracket 18 will be seen to be movable longitudinally of the body member 17 and to be provided with set screws 20 for securing the slidable bracket 18 in predetermined position thereon. The hitch member 19 is therefore adjustable longitudinally of the truck to which the device is affixed.

The forward end of the body member 17 carries a vertical bracket 21 thereon, which vertical bracket 21 is positioned at the desired elevation with respect to the body member 17 by the provision of one or more spacers 22. The uppermost end of the vertical bracket (which is of inverted U-shape construction when viewed endwise as in Figure 1) is provided with a transversely positioned offset section 23, the outermost portion of which is adapted to rest on the shoulder 16 of the saddle cap 13 against the inverted U bolts 14 as heretofore described.

A bolt 24 positioned through suitable openings in the body member 17, the spacers 22 and the horizontal portion of the vertical bracket 21 is provided with a pair of nuts 25 so that the vertical bracket 21 may be secured to the body member 17 thereby. The vertical adjustment of the hitch member 19 is thus provided for by the positioning of the vertical bracket 21 in spaced relation to the body member 17 by means of the spacers 22.

The back end of the longitudinal body member 17 is provided with a similarly formed, oppositely disposed, hinged clamping member 26, the vertical portion of which is bifurcated and formed similarly to the vertical portion of the vertical bracket 21. The uppermost portion of the vertical bracket 21 is provided with an offset section 27, the outermost portion of which is adapted to engage the rearmost portion 16 of the saddle cap 13 and rest thereon adjacent the U bolts 14, as heretofore described. The vertical portion of the clamping member 26 is hinged to a horizontal portion 28 thereof by means of a transversely positioned hinge pin 29. The horizontal portion 28 of the clamping member 26 is adjustably positioned on the rearmost end of the longitudinal body member by means of a plurality of spacers 30. A bolt 31 is positioned vertically through the body member 17, the spacers 30 and the horizontal portion 28 of the clamping member 26. Nuts 32 secure the assembly together.

In order that the clamping member 26 may be moved toward the vertical bracket 21 so that a clamping action may be had on the shoulders 16 of the saddle cap 13 and the U bolts 14 adjacent thereto, a section of roller chain 33 is pivotally affixed to the clamping member 26 by means of a pin 34 and passed beneath the saddle cap 13 and the other end thereof secured to one end of a threaded rod 35 which in turn is positioned through an opening in a pivoted block 36, the block 36 being pivoted between the bifurcated portions of the upright bracket 21. A nut 37 threadably engages the threaded rod 35 and bears against the pivoted block 36 so that the threaded rod 35 may be moved outwardly of the block 36 by rotation of the nut 37 and hence move the roller chain 33 and the clamping member 26 to the left as shown in Figures 2, 3 and 4 whereby a suitable clamping action is obtained.

It will thus be seen that a simple and efficient clamp-on type hitch has been disclosed which may be inexpensively made, adjusted for any particular truck axle construction width, height, etc., and readily positioned thereon permanently or temporarily by simply clamping the same thereto as hereinbefore described.

It will thus be seen that the clamp-on type truck hitch meets the several objects of the invention and provides an easily operated, simple and efficient truck hitch suitable for the indicated purpose.

Having thus described my invention, what I claim is:

1. Hitch means for trucks and the like and including clamping members engageable with the axle and saddle caps thereof, said clamping members depending beneath the said axle and saddle caps and means interconnecting clamping members for moving the same in clamping relation with respect to said axle and saddle caps a body member secured to the said clamping members and disposed beneath the said axle, a bracket slidable on said body member and a hitch pin secured to said bracket and extending sidewardly with respect thereto and adjustably positioned with respect thereto.

2. Hitch means for trucks and the like and comprising a body member disposed beneath the axle and saddle caps of said truck, a hitch pin adjustably positioned on said body member and extending sidewardly therefrom, an upstanding bracket on said body member for engaging the said saddle cap and an upstanding hinged clamping member on said body member for engaging the said saddle cap, flexible means positioned between the said hinged body member and the said upstanding bracket, and means for progressively shortening the interconnecting section of the said flexible means so as to move the said hinged clamping member toward the said upstanding bracket and thereby cause the clamping of the said hitch to the said truck.

3. Hitch means for trucks and the like and comprising a body member disposed beneath the axle and saddle cap of said truck, a hitch pin adjustably positioned on said body member and extending sidewardly therefrom, an adjustably positioned, upstanding bracket on said body member for engaging the said saddle cap, and an adjustably positioned, upstanding hinged clamping member on said body member for engaging the said saddle cap, flexible means adjustable as to length positioned between the said hinged body member and the said upstanding bracket whereby the said hitch may be clamped to the said axle.

WILLIAM J. MILLER.

REFERENCES CITED

The following references are of record in the file of this patent:

UNITED STATES PATENTS

| Number | Name | Date |
|---|---|---|
| 1,523,597 | Lang | Jan. 20, 1925 |
| 2,213,690 | Caldwell | Sept. 3, 1940 |